(12) United States Patent
Haneda (10) Patent No.: US 6,894,803 B1
(45) Date of Patent: May 17, 2005

(54) FILING SYSTEM AND REPRODUCTION APPARATUS

(75) Inventor: Norihisa Haneda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/426,135

(22) Filed: Oct. 25, 1999

Related U.S. Application Data (62) Division of application No. 08/696,062, filed on Aug. 13, 1996, now Pat. No. 6,016,184.

(30) Foreign Application Priority Data

Aug. 24, 1995 (JP) .............................................. 7-237876

(51) Int. Cl.$^7$ .............................................. G06F 13/00
(52) U.S. Cl. ..................... 358/1.2; 358/298; 358/299; 358/518; 358/452; 358/453; 348/97; 348/231.99; 348/230.01; 348/209.99; 348/445; 386/131; 386/125; 386/126; 386/95
(58) Field of Search ........................ 358/1.2, 518, 452, 358/453; 382/298, 299; 348/445, 97, 231.99, 230.01, 209.99; 386/131, 125, 126, 95

(56) References Cited

U.S. PATENT DOCUMENTS

| | | | |
|---|---|---|---|
| 5,428,721 A | | 6/1995 | Sato et al. |
| 5,455,631 A | * | 10/1995 | Nakajima ................... 348/556 |
| 5,477,353 A | * | 12/1995 | Yamasaki ................... 358/487 |
| 5,493,418 A | | 2/1996 | Takahashi et al. |
| 5,612,796 A | | 3/1997 | DeCook et al. |
| 5,633,726 A | * | 5/1997 | Timmermans ............... 386/70 |
| 5,790,276 A | | 8/1998 | Stephenson, III |
| 5,799,219 A | | 8/1998 | Moghadam et al. |
| 5,841,885 A | * | 11/1998 | Neff et al. ................... 348/64 |
| 5,999,220 A | * | 12/1999 | Washino ...................... 348/441 |
| 6,094,218 A | * | 7/2000 | Suzuki et al. ................. 348/96 |
| 6,259,479 B1 | * | 7/2001 | Gadre et al. ................. 348/441 |
| 6,400,473 B1 | * | 6/2002 | Kodama ..................... 358/527 |
| 6,441,854 B2 | * | 8/2002 | Fellegara et al. ...... 348/333.13 |

FOREIGN PATENT DOCUMENTS

| | | |
|---|---|---|
| JP | 3-153228 A | 7/1991 |
| JP | 5-252361 A | 9/1993 |
| JP | 6-237378 A | 8/1994 |

OTHER PUBLICATIONS

Photoshop 5, May 1998, by Gary David Bouton and Barbara Bouton.*

* cited by examiner

Primary Examiner—Edward Coles
Assistant Examiner—Alan Rahimi
(74) Attorney, Agent, or Firm—Birch, Stewart, Kolasch & Birch, LLP (57) ABSTRACT

In an arrangement in which an image captured by photography is recorded on new-type photographic film having an information recording zone for magnetically recording information relating to the film or frames on the film, information concerning the aspect ratio of the image is exploited in an effective manner and the aspect ratio is capable of being altered at will. The image recorded on the new-type photographic film and the aspect ratio information in the information recording zone are read by a film scanner. Original digital image data obtained by the reading operation, length X and width Y of the image and effective image size data (length A and width B) generated from the aspect ratio information are recorded on a floppy disk or optical disk by a disk device. When an original image represented by the original digital image data obtained from the floppy or optical disk is displayed, the size thereof is made that stipulated by the effective image size. The data representing the effective image size on the disk are rewritten in response to an entered alteration command.

4 Claims, 10 Drawing Sheets

ORIGINAL IMAGE
(HIGH-DEFINITION TYPE)

Fig. 10 (B)

CONVENTIONAL TYPE

Fig. 10 (C)

PANORAMIC TYPE

FILING SYSTEM AND REPRODUCTION APPARATUS

This application is a divisional of application Ser. No. 08/696,062, filed on Aug. 13, 1996, now. U.S. Pat. No. 6,016,184 the entire contents of which are hereby incorporated by reference.

BACKGROUND OF THE INVENTION

1. Field of the Invention

This invention relates to a filing system in which digital image data obtained from an input medium such as photographic film, printed matter or a memory card are recorded on an output recording medium such as a floppy disk or optical disk. The invention further relates to a reproduction apparatus for displaying an image represented by the digital image data that have been recorded on the recording medium created by filing system.

2. Description of the Related Art

A variety of information is being put into digital form and preserved by being recorded on various recording medium, as computers and equipments using computers are disseminated. Image information is no exception. In systems contemplated thus far, images that appear on photographic film, photographs and printing matter are read by a scanner, converted to digital image data and recorded on a recording medium such as a floppy disk or optical disk.

Meanwhile, new types of photographic film that take use in computerized equipment into account are being studied. Such photographic film is provided with an information recording portion along both sides for the purpose of magnetically recording data. Film and frame information relating to photography is recorded in the information recording portion.

One form of exploiting the information recording portion is pseudo-aspect-ratio photography (pseudo-panoramic photography, etc.). For example, in pseudo-panoramic photography, the field of view of the camera viewfinder is set to the aspect ratio of panoramic photography but the image recording portion of the new type of photographic film is exposed at the specified (high-definition) aspect ratio. Data indicative of the fact that panoramic photography has been performed are recorded in the information recording portion of the new-type photographic film.

Accordingly, when a photograph (after development, of course) is printed using the new-type film, the photograph printing apparatus reads the data in the information recording portion and, when the type of photography is identified as being pseudo-panoramic, the apparatus prints the photograph on photographic paper at the panoramic aspect ratio (while finely longitudinally masking the upper and lower parts of the image recording portion of the film).

There are occasions where it is desired to change the aspect ratio at a future date. For instance, this is when a photograph has been taken that does not satisfactorily reflect what the photographer intended at the time of photography, or when it has become necessary to change the purpose of the photograph. When a photograph has been taken by panoramic photography, for example, there are occasions where one realizes, after looking at the finished photograph, that the masked upper and lower portions are needed. Since photographic film of the new type is such that an image appears over the entire area of the image recording portion of the film, it is desirable to make possible the utilization of this fact.

SUMMARY OF THE INVENTION

An object of the present invention is to provide a system in which an image appearing on the above-mentioned new-type photographic film and information that has been recorded in the information recording portion are digitized and recorded on a recording medium in a form that allows the image and information to be fully exploited, as well as an apparatus for reproducing the image from the recording medium.

Another object of the invention is to provide a filing system and reproduction apparatus capable of dealing with images that appear not only on new-type photographic film but also on conventional film, photographs or printed matter.

A further object of the invention is to arranged it so that information relating to the aspect ratio of an image can be changed at will in the above-described system and apparatus.

A filing system according to the present invention comprises film reading means for reading, from a developed film having an information recording portion relating to at least a frame, an image of the frame appearing on the film to generate original digital image data representing the image and reading data relating to information that has been recorded in the information recording portion, size-data creating means for creating data representing size of an original image and data representing size of an effective image on the basis of the original digital image data and data representing the information obtained from the film reading means, recording means for recording, in mutually correlated form on a portable recording medium, the original digital image data and data representing the information obtained from the film reading means, and the data representing the size of the original image and the data representing the size of the effective image created by the size-data creating means, and aspect altering means responsive to an entered aspect alteration command for rewriting the data representing the size of the effective image, which data have been recorded on the recording medium, by new data representing a commanded size for the effective image.

An image appearing on new-type photographic film and information containing information relating to the aspect ratio that has been recorded in the information recording portion are read. The information relating to the aspect ratio, which information serves as data representing the size of the effective image, and the digital image data representing the image are correlated and recorded on a recording medium such as a floppy disk or optical disk. The data representing the size of the effective image can be altered at will by the operator or user.

The image data recorded on the recording medium can be exploited in several ways. For example, the image represented by the image data can be enjoyed by being displayed on a monitor, or the image represented by the image data can be printed to create a photograph using a photograph printer. The aspect ratio of an image displayed or printed can be decided based upon the data representing the size of the effective image, which represents the information related to the aspect ratio. When it is necessary to change the aspect ratio, or when it is desired to do so, this can be achieved by rewriting the data relating to the size of the effective image recorded on the recording medium.

With the filing system according to the present invention, the image input medium is not limited to new-type photographic film but also includes conventional film, printed matter on which an image or other visible information appears, or a memory card on which image data have been stored.

A filing system of wider scope according to the invention applicable to an input medium comprises image reading means for reading an image represented on the input medium and generating original digital image data representing the image, size-data creating means for creating data representing size of an original image and data representing size of an effective image using at least the original digital image data obtained from the image reading means, recording means for recording, in mutually correlated form on a portable recording medium, the original digital image data obtained from the image reading means and the data representing the size of the original image and the data representing the size of the effective image created by the size-data creating means, and aspect altering means responsive to an entered aspect alteration command for rewriting the data representing the size of the effective image, which data have been recorded on the recording medium, by new data representing a commanded size for the effective image.

If the input medium is new-type photographic film, then data relating to the size of the effective image can be created based upon the information read from the information recording portion. If data relating to the size of the effective image (namely data relating to the aspect ratio of the image) do not exist on the input medium, the operator or user may enter the data relating to the size of the effective image or set the data to be the same as the data representing the size of the original image.

Thus, when image data that have been recorded on a recording medium are utilized in the display or printing of an image, the data relating to the size of the effective image can be utilized to decide the aspect ratio of the image, and the data relating to the size of the effective image can be altered whenever necessary.

The present invention further provides a reproduction apparatus for reproducing an image based upon image data recorded on a recording medium. The reproduction apparatus can be implemented as part of the above-described filing system or realized as a separate, independent unit.

The reproduction apparatus comprises display means for reading digital image data from a recording medium on which the digital image data and data representing the size of an effective image have been stored in mutually correlated form, and displaying an image which represents the digital image data that have been read, and aspect altering means responsive to an entered aspect alteration command for rewriting the data representing the size of the effective image, which data have been recorded on the recording medium, by new data representing a commanded size for the effective image.

The image data representing the size of the effective image relating to the aspect ratio can be rewritten on the recording medium while the image represented by the image data recorded on the recording medium (the image having the aspect ratio decided when necessary by the data representing the size of the effective image) is or is not displayed.

A filing system according to the invention defined from a second aspect comprises film reading means for reading, from a developed film having an information recording portion relating to at least a frame, an image of the frame appearing on the film to generate original digital image data representing the image and reading data relating to information that has been recorded in the information recording portion, size-data creating means for creating data representing size of an original image and data representing size of an effective image on the basis of the original digital image data and data representing the information obtained from the film reading means, and recording means for recording, in mutually correlated form on a portable recording medium, the original digital image data and data representing the information obtained from the film reading means, and the data representing the size of the original image and the data representing the size of the effective image created by the size-data creating means.

This system is particularly effective when the above-described new-type photographic film is the input medium.

A filing system according to the invention having greater universality comprises image reading means for reading an image represented on an input medium and generating original digital image data representing the image, size-data creating means for creating data representing size of an original image and data representing size of an effective image using at least the original digital image data obtained from the image reading means, and recording means for recording, in mutually correlated form on a portable recording medium, the original digital image data obtained from the image reading means and the data representing the size of the original image and the data representing the size of the effective image created by the size-data creating means.

This system is capable of using not only the new-type photographic film but also the conventional film, printed matter and a memory card as the input medium.

In accordance with the filing system of the invention, the data representing the size of the effective image relating to aspect ratio are recorded on the recording medium together with the image data. As a result, when the image data are exploited in displaying or printing an image, the data representing the size of the effective image can be utilized.

A reproduction apparatus according to the invention applied to reproduction of an image using this recording medium comprises readout means for reading data out of a recording medium on which digital image data and data representing the size of an effective image have been stored in mutually correlated form, manipulating means for manipulating the digital image data, which have been read out by said readout means, to image data representing an image having an aspect ratio stipulated by the data representing the size of the effective image, and display means for displaying the image represented by the image data manipulated by the manipulating means.

The reproduction apparatus also may be implemented as part of a filing system or as an independent unit.

In accordance with the reproduction apparatus, it is possible to reproduce an image having an aspect ratio stipulated by the data representing the size of the effective image stored on the recording medium along with the image data.

When reduced-image data (data representing a thumbnail image or an index image) have been recorded on the recording medium, data representing the effective image can be utilized even at the time of reduced-image playback to display the reduced image having an aspect ratio decided by the data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT (1) System Architecture

Figure 1:
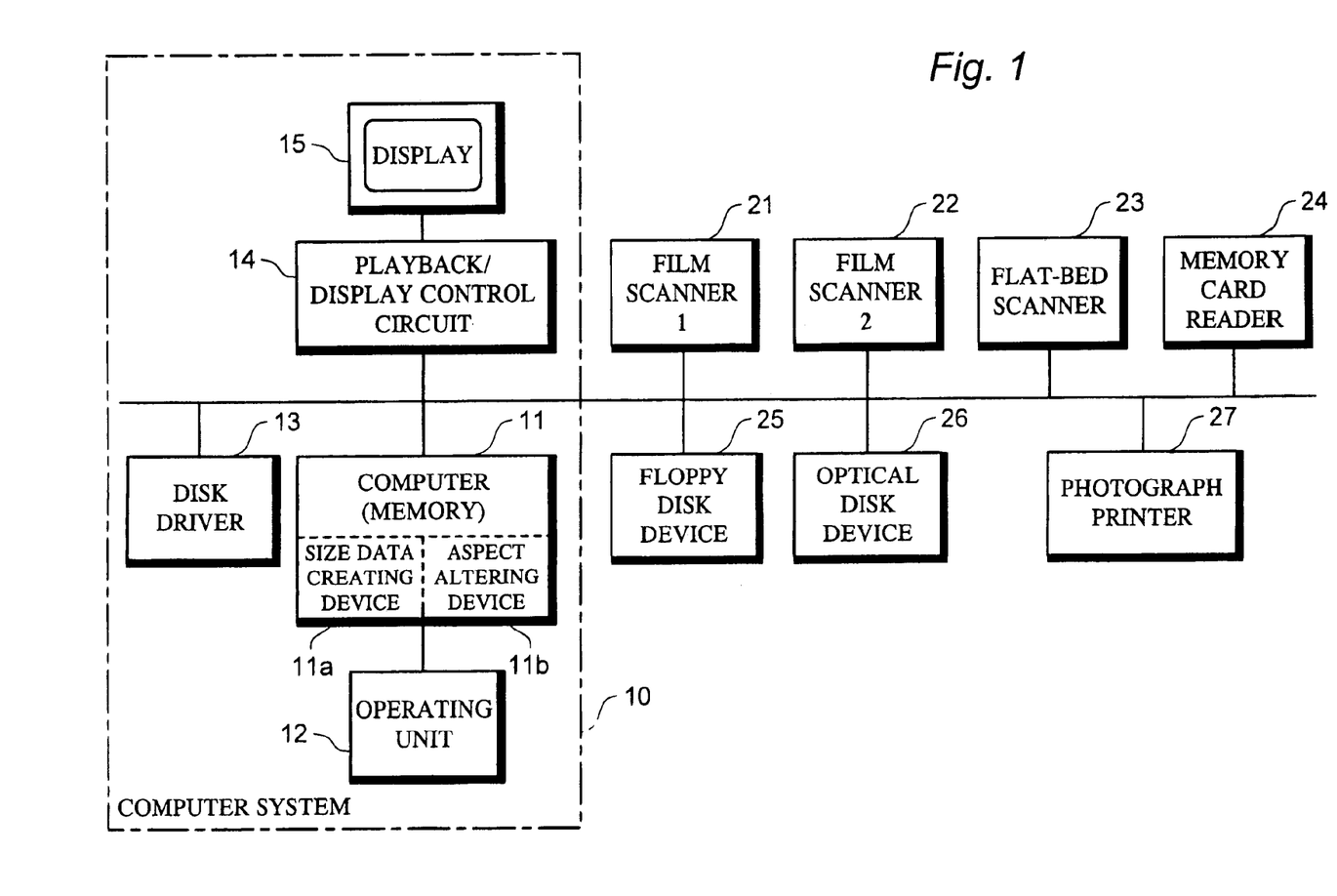
FIG. 1 is a block diagram illustrating the electrical configuration of a filing system.

FIG. 1 illustrates the electrical configuration of a filing system.

The filing system is installed at various locations. Examples are photographic film processing laboratories (stores), photography stores, department stores, convenience stores and other types of stores and shops.

The media handled by this filing system may be classified broadly into two types. One is a medium on which an image is visually represented, such as a photographic film, a photograph printed on photographic paper and an image on printed matter (e.g., a photograph on a poster or calendar, etc.). Such media shall be referred to as "visual image media". The second is a medium on which digital data representing an image are recorded (or stored). Examples are optical disks, magnetic disks and memory cards. Such media shall be referred to as digital media.

Broadly speaking, the filing system has two functions, namely filing processing (for a filing service) and print processing (for a printing service).

Visual image media and a memory card are used as the input media in filing processing, and an optical disk or magnetic disk is used as the output medium. The visual image appearing on visual image media serving as the input media is read by a scanner. The image signal output produced by the scanner is converted to digital image data and then subjected to processing such as data compression when necessary, after which the resulting data are recorded on an output medium such as an optical disk or magnetic disk in a predetermined format. Image data that have been recorded on a memory card serving as the input medium are read out by a memory card reader and recorded on an output medium such as an optical disk or magnetic disk in a predetermined format. In a case where images of a plurality of frames appear on visual image media serving as the input media, the frames that are to be recorded on the output media are selected as necessary. Similarly, in a case where image data of a plurality of frames appear on a memory card serving as the input medium, the frames that are to be recorded on the output media are selected as necessary. As will be described later in greater detail, data representing the size of an original image and data representing the size of an effective image are recorded on the output media per each frame of image data.

Digital media inclusive of optical and magnetic disks and visual image media are used as the input media in print processing. The output medium is a printed photograph. A frame of image data to be printed is read out of a digital medium serving as the input medium. These image data are applied to a photograph printer so that the image represented by the image data may be printed on recording paper. In a case where photographic film is used as the input medium, the image (negative or positive) appearing on the film is printed on photographic paper by a photograph printing apparatus. Alternatively, the image on the film is read by a film scanner. The image signal outputted by the film scanner is applied to a photograph printer (after being converted to digital image data if necessary), whereby a printed photographic is obtained. Similarly, if the input medium is printed matter, the image represented on the printed matter is read by a scanner, the output image signal whereof is applied to the photograph printer.

In this embodiment, the detailed description will deal mainly with filing processing.

The filing system includes a computer system 10. The computer system 10 has a computer 11 which further includes a size data creating device 11a and an aspect altering device 11b, an operating unit 12, a disk driver 13, a playback/display control circuit 14 and a display unit 15. The computer 11 controls not only the computer system 10 but also the overall operation of the filing system. The computer 11 includes memories (a semiconductor memory, floppy disk and hard disk, etc.) and other peripherals.

The operating unit 12 is for entering various commands and data when the filing system is used by an operator or user. Specifically, the operator or user employs the operating unit 12 to select the type of processing (service) (i.e., filing processing or print processing), designate the input medium, designate the frame to be recorded or printed on the output medium, enter a command for altering aspect ratio, designate a frame and enter type or size representing aspect ratio in aspect alteration processing, described later, and designate an image to be reproduced in reproduction processing. The operating unit 12 includes various function keys, and a ten-key pad, etc. Preferably, these keys are implemented on a touch panel formed on the display screen of the display unit 15. More specifically, guidance (comprising illustrations and text) for guiding operation and one or a plurality of demarcated sections to be touched are displayed on the display screen of the display unit 15. The arrangement is such that an input signal conforming to a section touched by the finger of the operator or user is applied to the computer 11.

The disk driver 13 writes data to a hard disk, optical disk or magneto-optical disk or reads data from these disks. A program for operating the filing system has been recorded on the disk in advance. The disk driver 13 reads the program from the disk and applies it to the computer 11. Further, the disk driver 13 temporarily stores image data, which have been read by film scanners 21, 22, 23, etc., described later, on a disk. In a case where a hard disk and an optical disk are used, two special-purpose disk drivers for these are provided.

The playback/display control circuit 14 and the display unit 15 are used in displaying the guidance and touch-panel sections, described above, when the operator or user operates the filing system, and in displaying an image represented by image data read from the input medium or to be applied to the output medium. The display unit 15 is implemented by a CRT display device, liquid-crystal display device, etc.

The filing system is further provided with film scanners 21, 22, a flat-bed scanner 23, a memory card reader 24, a floppy disk device 25, an optical disk device 26 and a photograph printer 27. These components are connected to the computer 10 by an SCSI (small computer system interface) bus.

Two types of photographic film may be used as input media in the filing system of this embodiment. One type is conventional photographic film referred to as 35-mm film. Photographic film of this conventional type is 12-, 24- and 36-frame exposure roll film. After the film is exposed, it is cut into lengths of six frames each and the cut lengths are usually preserved by being placed in sheaths. The second type is new-type photographic film both sides of which have a slender, strip-shaped information recording portion comprising a transparent magnetic material. Information (film information) relating to the film and information (frame information) relating to frames are capable of being recorded in the information recording portion. The new-type photographic film is stored in roll form in a cartridge after being developed.

More specifically, the film information includes information written by a camera automatically and information written based upon input from the user. An example of the latter information is information representing the event (e.g., an athletic meet, a birthday party) with which the image captured using the film is associated. The frame information also includes information written by the camera automatically and information written based upon input from the user. A typical example of the former is information representing the shutter speed used when the image of the frame is captured and information representing pseudo-aspect ratio, described in detail below. An example of the latter is the title of the image of the frame, where the title is entered by the user.

The film scanner 21 reads an image (negative or positive) appearing on the image recording area of the new-type photographic film, outputs an image signal (image data) representing this image, reads information that has been recorded in the information recording portion of the new-type film and output data representing this information. The film scanner 21 is constituted by a film feeding mechanism that feeds the film at a commanded pitch, a light source that illuminates the film, an image sensing optical system (inclusive of a diaphragm, shutter and zoom lens as necessary), a CCD line sensor, signal processing circuitry (inclusive of whichever of a white balance circuit, gamma-correction circuit and negative/positive reversal circuit, etc., are necessary) for processing a video signal (or digital image data following an A/D conversion) obtained from the line sensor, an A/D converter circuit, a magnetic head for reading information recorded in the information recording portion, and a magnetic reading circuit for applying the necessary processing (demodulation, encoding, etc.) to the read signal outputted by the magnetic head. Digital image data obtained when the new-type photographic film has been fed by the smallest pitch shall be referred to as "original digital image data". The digital image data and the data representing the information read from the information recording portion are temporarily stored in the memory or disk within the computer system 10. The resolution (number of pixels and number of tones) of the original digital image data is decided in dependence upon the degree of resolution required in photographic printing. For example, numbers of pixels are 3072×2048, 204×1536, etc., and the tones are represented by eight bits with regard to each of the primary colors R, G and B.

The film scanner 22 reads an image (negative or positive) appearing on conventional photographic film and outputs an image signal (image data) representing this image. The film scanner 22 includes a light source, an image sensing optical system, a line sensor (or two-dimensional image sensing device), a mechanism for feeding the film or line sensor, a signal processing circuit and an A/D converter circuit, etc. Image data obtained from the conventional photographic film are referred to as "original digital image data" and has a number of pixels and number of tones the same as the number of pixels and tones of the image data obtained from the new-type photographic film.

The flat-bed scanner 23 reads a picture, photograph, figure or character (referred to collectively as an "image") represented on printed matter and outputs an image signal (image data) representing the image that has been read. The scanner 23 has a flat bed on which the printed matter to be read is placed. The light from the light source is projected upon the printed matter and light reflected from the printed matter enters the line sensor or two-dimensional image sensing device. The video signal outputted by the line sensor or image sensing device is outputted as digital image data following application of prescribed processing. The image data obtained by reading the printed matter shall be referred to as "original digital image data".

The memory card reader 24 reads image data out of a memory card serving as the input medium in filing processing.

The floppy disk device 25 writes image data and other data to a floppy disk (magnetic disk) serving as the output medium in filing processing and reads image 11 data and other data from a floppy disk serving as the input medium in print processing. In aspect alteration processing and reproduction processing described later, the floppy disk device 25 reads image data and other data from a floppy disk and rewrites the data on the floppy disk. In a case where the floppy disks used are ordinary floppy disks and high-density floppy disks, two floppy disk devices are provided to handle the floppy disks of these two types.

The optical disk device 26 writes data inclusive of image data to an optical disk (inclusive of a magneto-optical disk) serving as the input medium and output medium, or reads such data out of the disk and rewrites the data.

It will suffice if the filing system has at least the floppy disk device 25 or the optical disk device 26.

The photograph printer 27 is used in print processing and prints an image represented by image data applied thereto.

(2) Recording Format

Figure 2:
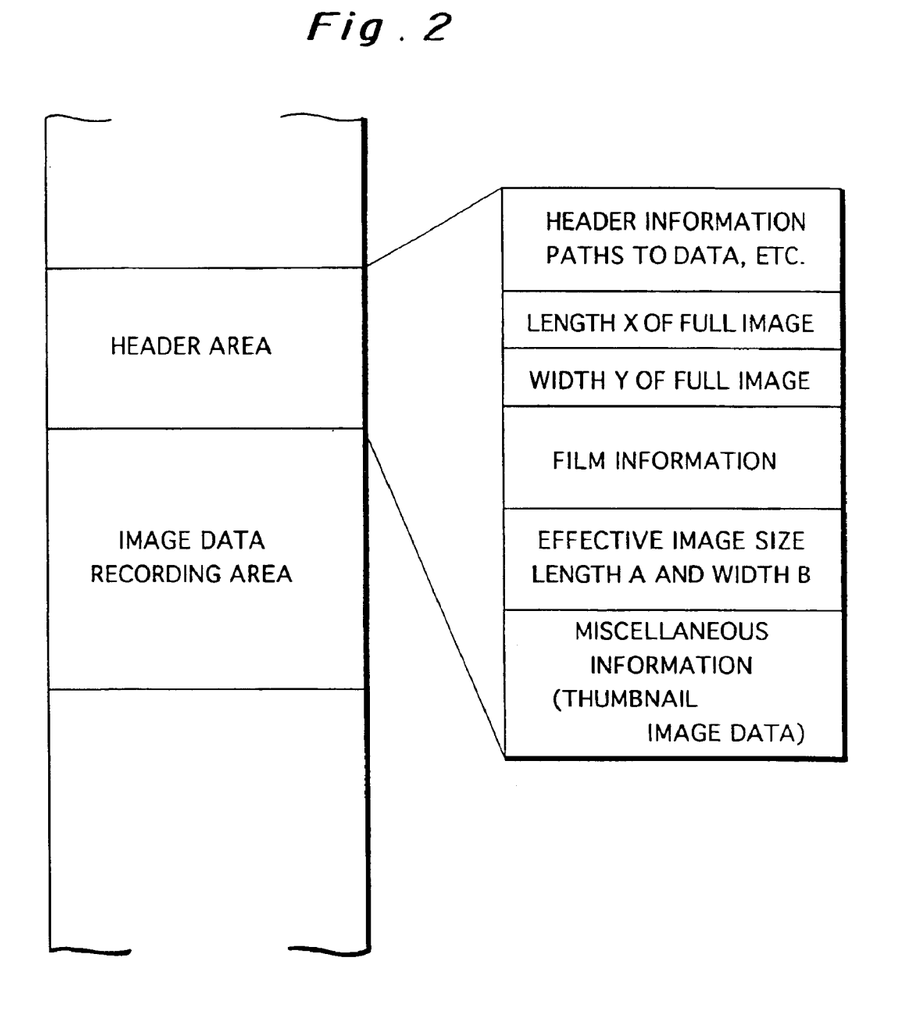
FIG. 2 illustrates the format of an image file.

FIG. 2 illustrates a recording format regarding one frame of image data on a floppy disk or optical disk. A collection of image data in accordance with this recording format and various data accompanying the image data is referred to as an "image file". An image file is created for every frame. Image files are created in filing processing and recorded on an output medium (floppy disk or optical disk). A floppy disk or optical disk on which an image file has been recorded serves as the input medium in print processing.

This recording format is mainly concerned with new-type photographic film. A variety of functions with, which a camera capable of using new-type photographic film should be equipped have been proposed. One of them is pseudo-aspect-ratio photography (e.g., pseudo-panoramic photography).

The aspect ratio of the image recording area of new-type photographic film is 16 (width)×9 (height=length). An image with this aspect ratio (16×9) is referred to as being of high-definition type (H type). Types other than high-definition type are chiefly conventional type (C type) and panoramic type (P type). The conventional type has an aspect ratio (3×2), which is the same as the aspect ratio of the frames of conventional photographic film. The panoramic-type image is of elongated width and has an aspect ratio of about 16×5.

Pseudo-aspect-ratio photography is photography in which photography is performed upon setting only the field of view of the camera viewfinder to an aspect ratio of a type other than the high-definition type. Alteration of the field of view can be achieved mechanically (as by moving a slider having a window of a different size) or electrically (by setting a mask using liquid crystals). Even if the viewfinder is set to a field of view having an aspect ratio other than that of the high-definition type, the image recording area of new-type photographic film will still be sensitized over its entirety at the aspect ratio of high-definition type. Accordingly, the image appearing in the image recording area of new-type photographic film after the film has been developed will always have the high-definition aspect ratio. The data representing the pseudo-aspect ratio to which the viewfinder has been set is magnetically recorded by the camera as one type of frame information in the information recording portion of the new-type photographic film.

The image file is provided with a header area and an image-data recording areas.

"Header information, paths to each of the data, etc.", "image length X and image width Y of full image", "film information", "effective image size (length A and width B)" and "miscellaneous information" are recorded in the header area.

The header information includes the date, frame number and type of compression (the latter in a case where image data recorded in the image-data recording area have been subjected to data compression). The path to each item of data is information required so that the computer can access the storage location at which each item of data or information has been stored.

The image length X and image width Y of a full image are represented by the numbers of pixels in the length (height) and width directions of the original digital image data obtained when an image has been read from visible image media by the film scanner 21, 22 or 23 (at the highest resolution of the scanner). For example, the length X and width Y of a full image on new-type photographic film read by the film scanner 21 are 2048 and 3072, respectively.

In the case of new-type photographic film, an image appears over the entirety of the image recording area of the film even if the film has been exposed by pseudo-aspect-ratio photography. This means that the length X and width Y of a full image are determined by the size of the image recording area and the resolution of the film scanner 21.

Of course, the length X and width Y of a full image will have values different from the above when only what is in the range (which corresponds to the field of view of the viewfinder) decided by the data representing the aspect ratio that have been recorded as frame information in the information recording portion is read by the film scanner 21 from the image recording area on the new-type photographic film.

The film information stored in the image file is frame information of the pertinent frame read from the information recording portion of the new-type photographic film. Since the data representing the aspect ratio express the effective image size, described next, it is unnecessary for these data to be included in the film information mentioned here.

The effective image size (length A and width B) is calculated using the full (overall) image length X and width Y and the data representing the aspect ratio. For example, in a case where data representing aspect ratio read from the information recording portion of new-type photographic film are indicative of the panoramic type and the length X and width Y of the full (overall) image are 2048 and 3072, respectively, the size (A, B) of the effective image is calculated in the following manner. Assume that the width Y of the full image and the width B of the size of the effective image are set to be equal, that the aspect ratio (width×height) of high-definition type is 16×9 and that the aspect ratio of panoramic type is 16×5. The calculations are as follows:

length $A = 2048 \times (5/9) = 1138$ width $B = $ width $Y = 3072$

These calculations are performed by the computer 11 when the image data and frame information is read from the photographic film by the scanner 21 or when the image data and data X, Y, A, B, etc. are written into the floppy disk (or optical disk).

In general, X=A, Y=B are set with regard to image data read from conventional film or printed matter and image data read out of a memory card. Of course, it may be so arranged that the operator or user is capable of entering the effective image size (A, B), and the entered size (A, B) is written to a disk.

Data representing the aspect ratio can be recorded instead of the effective image size (A, B).

The miscellaneous information includes thumbnail image data. Thumbnail image data (data representing a reduced image) are obtained by subsampling the original image data or by obtaining an average every small grouping of pixels and adopting the average value as one pixel of data. For example, the original image data are reduced to $1/32$ of the original quantity of data to obtain thumbnail image data. Further, the creation of the thumbnail image data also is carried out by the computer 11. The thumbnail image data are utilized when a desired image is selected from among a large amount of image data stored on a floppy disk or optical disk.

The original digital image data are recorded in the image-data recording area. When necessary, the original image data are recorded after being subjected to data compression.

(3) Filing processing

Figure 3:
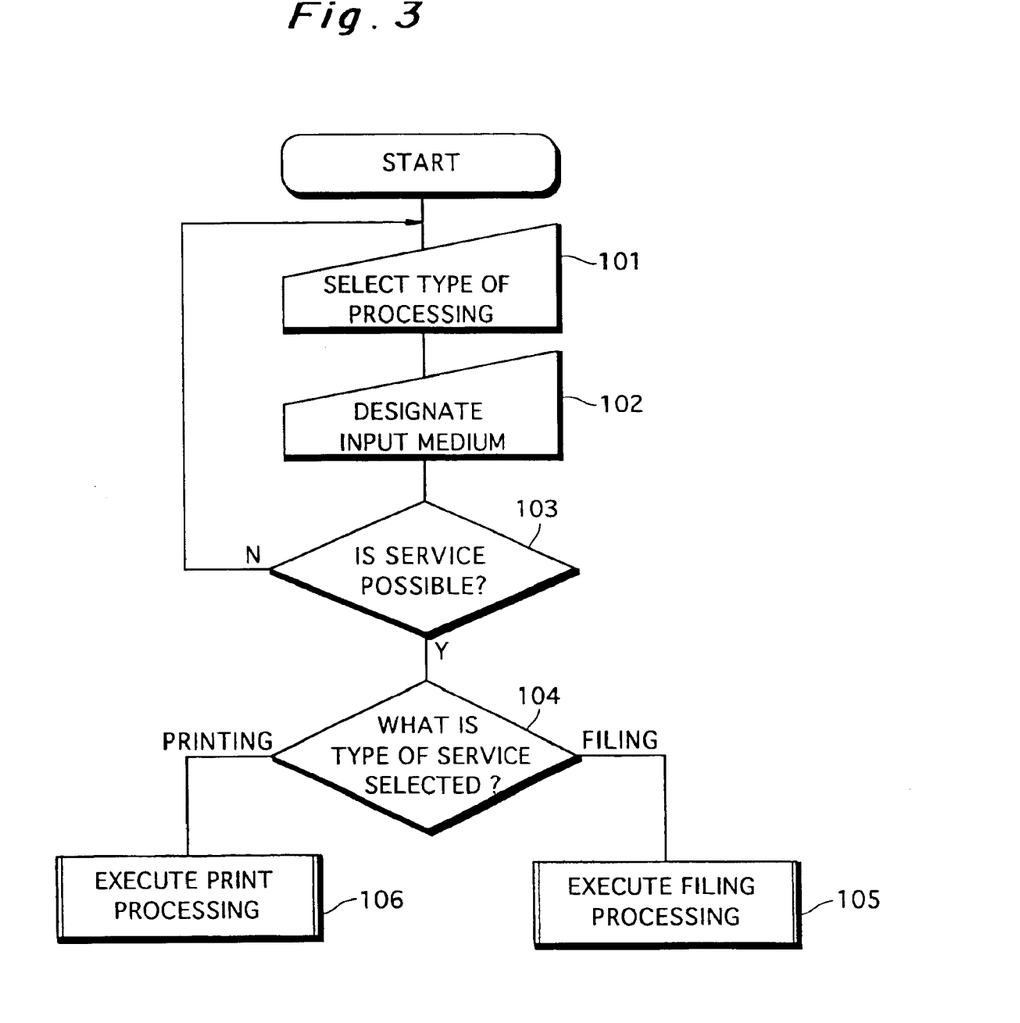
FIG. 3 is a flowchart illustrating the overall processing procedure of the filing system.

FIG. 3 illustrates the essentials of the overall processing procedure executed in the filing system. This processing, as well as filing processing, aspect alteration processing and reproduction processing, described later, is controlled mainly by the computer 11.

As described above, guidance prompting the operator or user to select filing processing (the filing service) or print processing (the printing service) is displayed on the display screen of the display unit 15. In response, the operator or user provides an input, which selects one of the above, from the operating unit 12 (step 101).

Next, in accordance with guidance prompting designation of the input medium used in the selected processing (service), the operator or user designates his or her own input medium through the operating unit 12 (step 102). For example, in case of filing processing, the usable input media are a memory card, new-type photographic film, conventional photographic film and printed matter. Accordingly, the operator or user designates any one of these. It is of course preferred that no guidance be provided with regard to input media that cannot be handled by the filing system.

A check is made to determine whether the input medium designated in the processing (service) of the selected type is capable of being handled by the filing system (step 103). If it is impossible for the filing system to handle the input medium, an indication to this effect is displayed and the operator or user stops utilizing the filing system or selects other processing (another service) or other input medium.

In a case where the filing system is capable of executing processing and the input medium is one capable of being handled, the program proceeds to the selected filing processing or print processing (steps 104, 105, 106).

In a filing system in which only one of filing processing and print processing can be executed, selection (step 101) of the processing (service) is unnecessary.

In a filing system provided with an inlet (a slot or other opening) for receiving a usable input medium, it is obvious that an input medium for which such an inlet is not available cannot be used. Accordingly, the designation of the input medium (step 102) and the determination as to whether processing is possible (step 103) can be eliminated.

Figure 4:
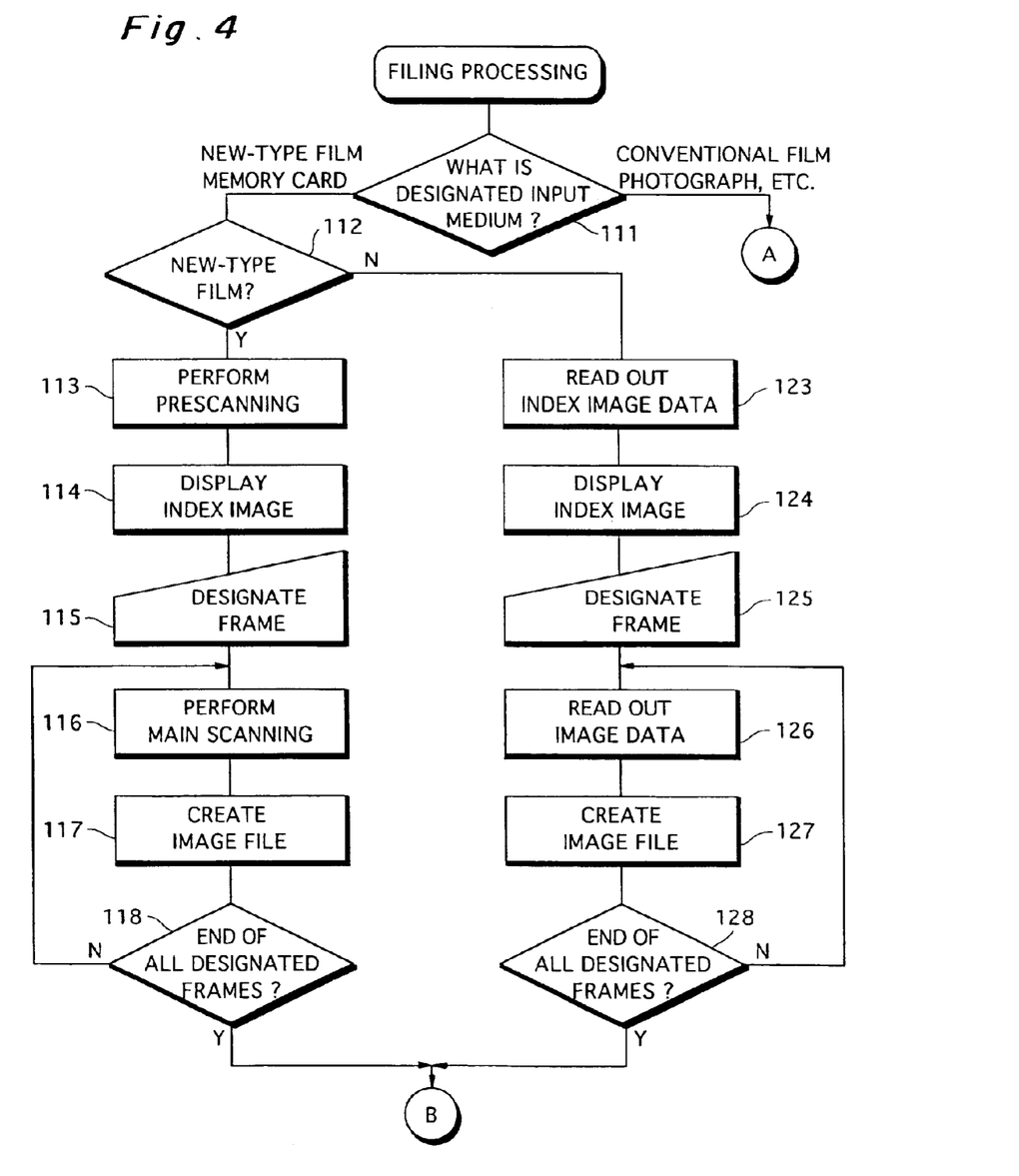
FIGS. 4 and 5 are flowcharts illustrating filing processing.
Figure 5:
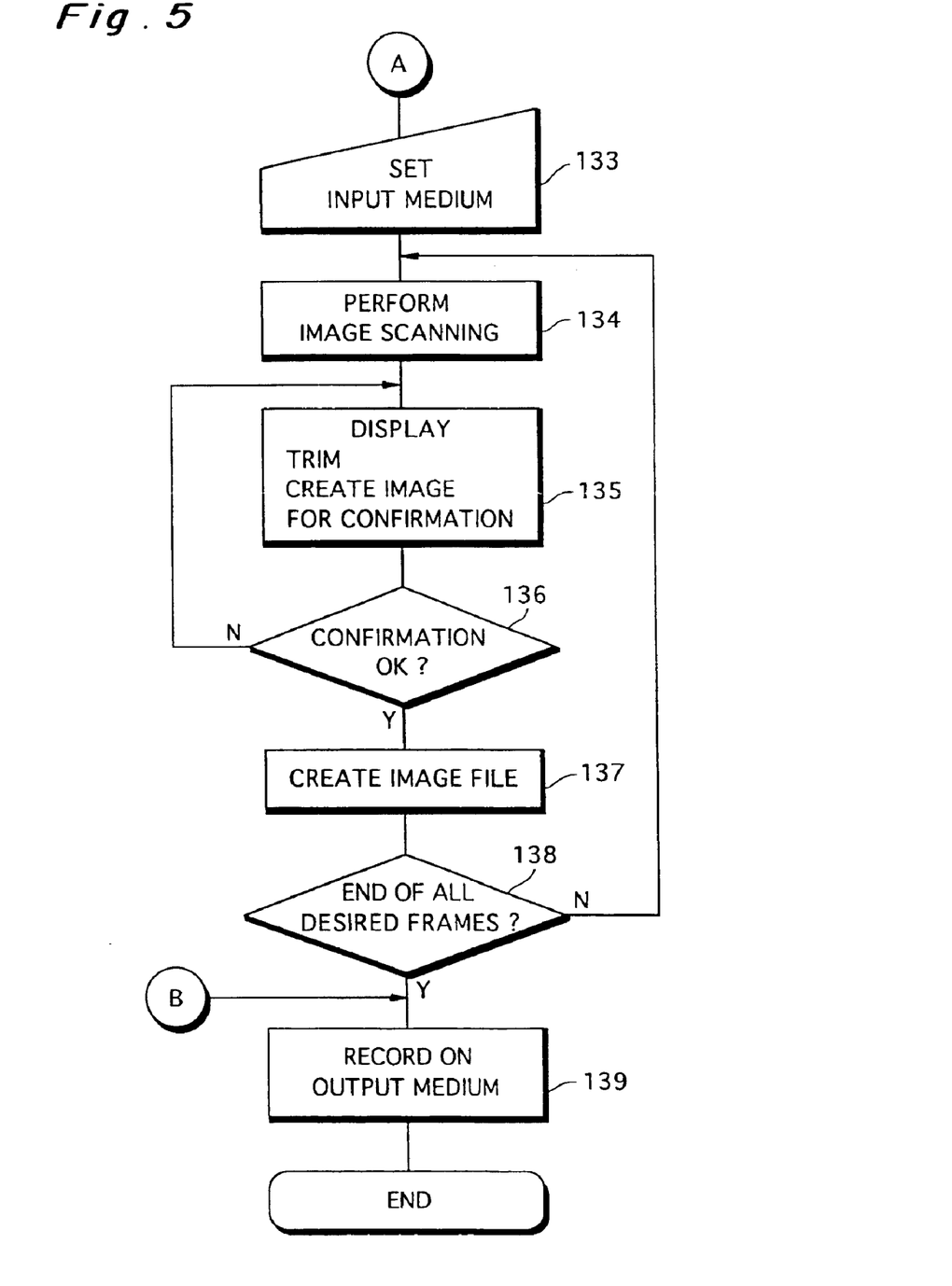

FIGS. 4 and 5 illustrate the details of filing processing (step 105).

Processing differs depending upon the type of input medium designated at step 102 or introduced into the inlet (steps 111, 112).

In a case where the input medium is new-type photographic film, the new-type photographic film is set in the film scanner 21 and prescanning of the image is performed at low resolution (step 113). Image data obtained by prescanning shall be referred to as "index image data". At this time the information (film information and frame information) that has been recorded in the information recording portion of the new-type photographic film is read. The index image data and the data representing the information in the information recording portion outputted by the frame scanner 21 are temporarily stored in the memory of the computer system 10.

An index image represented by index image data obtained by prescanning is displayed on the display unit 15 (step 114). It is preferred that index images of a plurality of frames be arrayed horizontally and vertically and displayed collectively together with the frame numbers. When the index images of all of the frames contained in one roll of new-type photographic film cannot be displayed collectively, these images would be divided into a plurality of groups and the groups would be displayed in succession. The screen is changed over in response to an input from the operator or user.

The operator or user observes the index images displayed on the display unit 15, selects the frame to be recorded on the output medium or the frame whose recording on the output medium is desired, and enters the selected frame via the operating unit 12 (step 115). A plurality of frames can also be designated. An arrangement may be adopted in which the operator or user is allowed to enlarge (zoom) or cut (trim) part of the index image of the designated frame. In this case, the image data representing the image of the zoomed or trimmed portion is read by main scanning in the manner described below, and the read data are recorded on the output medium as original image data.

When a frame is designated, the image of the designated frame on the new-type photographic film is read by the film scanner 21 at maximum resolution (main scanning) (step 116). The original image data obtained by main scanning are temporarily stored in the memory of the computer system 11.

The computer 11 creates the image file shown in FIG. 2 using the original image data obtained in main scanning, the film information and the frame information already obtained in prescanning (step 117).

Main scanning and creation of the image file are carried out with regard to all designated frames (step 118). When image files are created with regard to all designated frames, the image files are recorded on the output medium by the floppy disk device 25 or optical disk device 26 (step 139).

In a case where a memory card has been designated as the input medium, the memory card is loaded in the card reader 24 and the index image data that have been stored in the memory card are read out (step 123). The index image data represent the results of reducing images expressed by the image data that have been stored in the memory card. Index image data generally are stored on a memory card.

The index images represented by the index image data read out of the memory card are displayed on the display unit 15 (step 124). The operator or user, therefore, uses the operating unit 12 to designate, from among the index images, an image desired to be recorded or an image that is to be recorded on the output medium (step 125).

The image data of the designated image (frame) are read out of the memory card (step 126) and an image file having the format shown in FIG. 2 is created (step 127). In the image data on the memory card, the number of pixels in the length and width directions of the image data are set as X and Y, respectively, and the settings A=X, B=Y are made. When the creation of image files regarding all designated images is finished, these image files are recorded on the output medium (step 139).

In case of a memory card on which index image data have not been stored, it is preferred that the image data be read out of the memory card and subjected to reduction processing (subsampling or averaging processing) to create reduced-image data equivalent to index image data, and that the images represented by the reduced-image data be displayed. The images represented by the image data read out of the memory card may be displayed without subjecting the image data to reduction processing. In any case, the operator or user will be capable of designating a desired image by either method.

In a case where the input medium is conventional photographic film, the operator or user sets the photographic film in the film scanner 22 in such a manner that the desired frame of the photographic film will be situated at the scanning position (step 133). If necessary, the frame number on the film is entered.

The film scanner 22 reads the image of the set frame (step 134). The image signal (image data) outputted by the film scanner 22 is applied to the computer system 10 and stored temporarily in the memory of the system, and the image represented by these image data is displayed on the display unit 15 (step 135).

The operator or user is capable of trimming part of the displayed image on the screen on which the image is displayed. Since the trimmed image is displayed, the operator or user can check to see whether trimming is being performed as desired.

A long, slender black portion (a portion not sensitized because it has been masked) appears at positions above and below the image elongated in the width direction in a frame of conventional photographic film shot in the panoramic mode. With regard to such a panoramic image, the operator or user is capable of cutting off the upper and lower black portions by trimming.

When the operator or user makes an entry from the operating unit 12 giving approval with regard to a trimmed display image or display image that is untrimmed (step 136), the image data representing the approved display image are treated as original digital image data. An image file is created using these original digital image data (step 137). The numbers of pixels in the length and width directions of the original image data are X and Y, respectively, and the settings A=X, B=Y are made.

The operations and processing set forth above are performed repeatedly, with regard to all film frames to be recorded on (or desired to be recorded on) the output medium, while the frame at the scanning position is changed (step 138). When creation of image files regarding the images of all frames is finished, these image files are recorded on the output medium (step 139).

In a case where the input medium is printed matter, the printed matter is placed on the flat bed of scanner 23 (step 133). The image on the printed matter is read by the scanner 23 (step 134) and displayed on the display unit 15 (step 135). While observing the displayed image, the operator or user designates the range (i.e., performs trimming) of the image desired to be recorded. The image having the designated range is displayed for the sake of approval. If an "OK" confirmation input is made (step 136), the image data representing the image of the designated range is treated as original image data. The numbers of pixels in the length and width directions of the original image data are X and Y, respectively, and the settings A=X, B=Y are made. An image file is created regarding these original image data (step 137) and the created image file is recorded on the output medium (step 139). Since the printed matter placed on the scanner usually is a single sheet, the processing for image file creation (steps 134–137) generally is not repeated following scanning.

(4) Reproduction Apparatus

Figure 6:
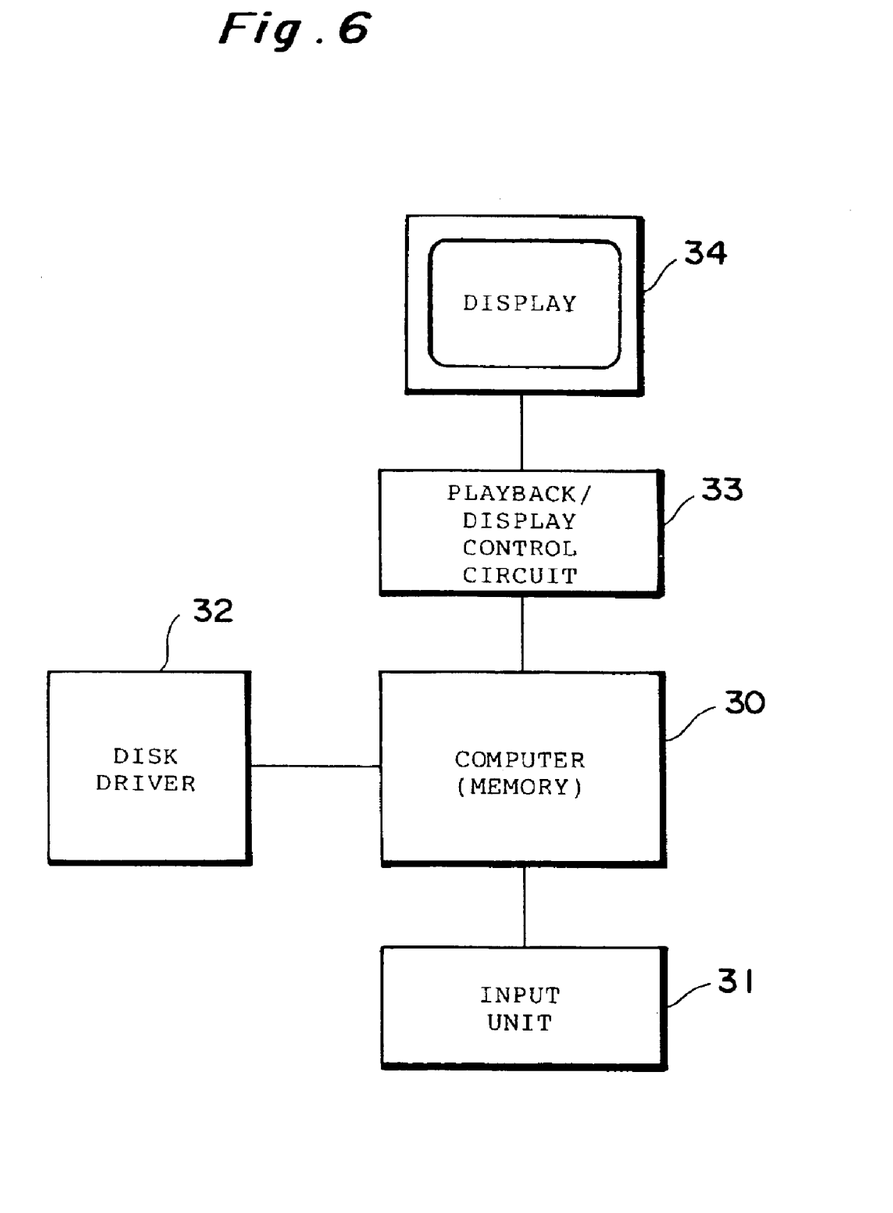
FIG. 6 is a block diagram illustrating the electrical configuration of a reproduction apparatus.

FIG. 6 illustrates the electrical configuration of the reproduction apparatus utilized by a user. The reproduction apparatus most generally is located at the residence of the user. The apparatus may also be installed at the company where the user is employed, at a company of the type which handles large quantities of photographs, at a store which develops and prints photographs, at a photography store, a department store, a convenience store and other types of stores and shops.

The reproduction apparatus in one embodiment is a simple reproduction machine in which an image represented by image data recorded on an output medium is displayed on the display screen of a display unit. In another embodiment, aspect alteration processing (alteration of the A and B dimensions of the effective image size), described later, can be carried out.

The reproduction apparatus also includes a computer 30, which has peripheral equipment such as a memory. An input unit 31, a disk driver 32 and a playback/display control circuit 33 are connected to the computer 30. A display unit 34 (a CRT display device or liquid-crystal display device) 34 is connected to the playback/display control circuit 33.

The disk driver 32, which reads data, inclusive of image data, out of an output medium (a floppy disk or optical disk) or writes required data to the output medium, signifies either of the above-mentioned floppy disk device 25 or optical disk device 26.

The input unit 31 enters various commands and data. As one example, the input unit 31 includes a keyboard and mouse and allows the user to enter a command, to select any of a plurality of displayed images and to enter data in accordance with a menu displayed on the display unit 34. In another example, the input unit 31 includes a touch panel provided on the display screen of the display unit 34, as in the manner of the operating unit described above. In such case the input unit 31 accepts entry of commands and data through the touch panel in accordance with displayed guidance.

The computer 30 executes aspect alteration processing (FIG. 7) and reproduction processing (FIGS. 8, 9), described next.

(5) Aspect Alteration Processing

Figure 7:
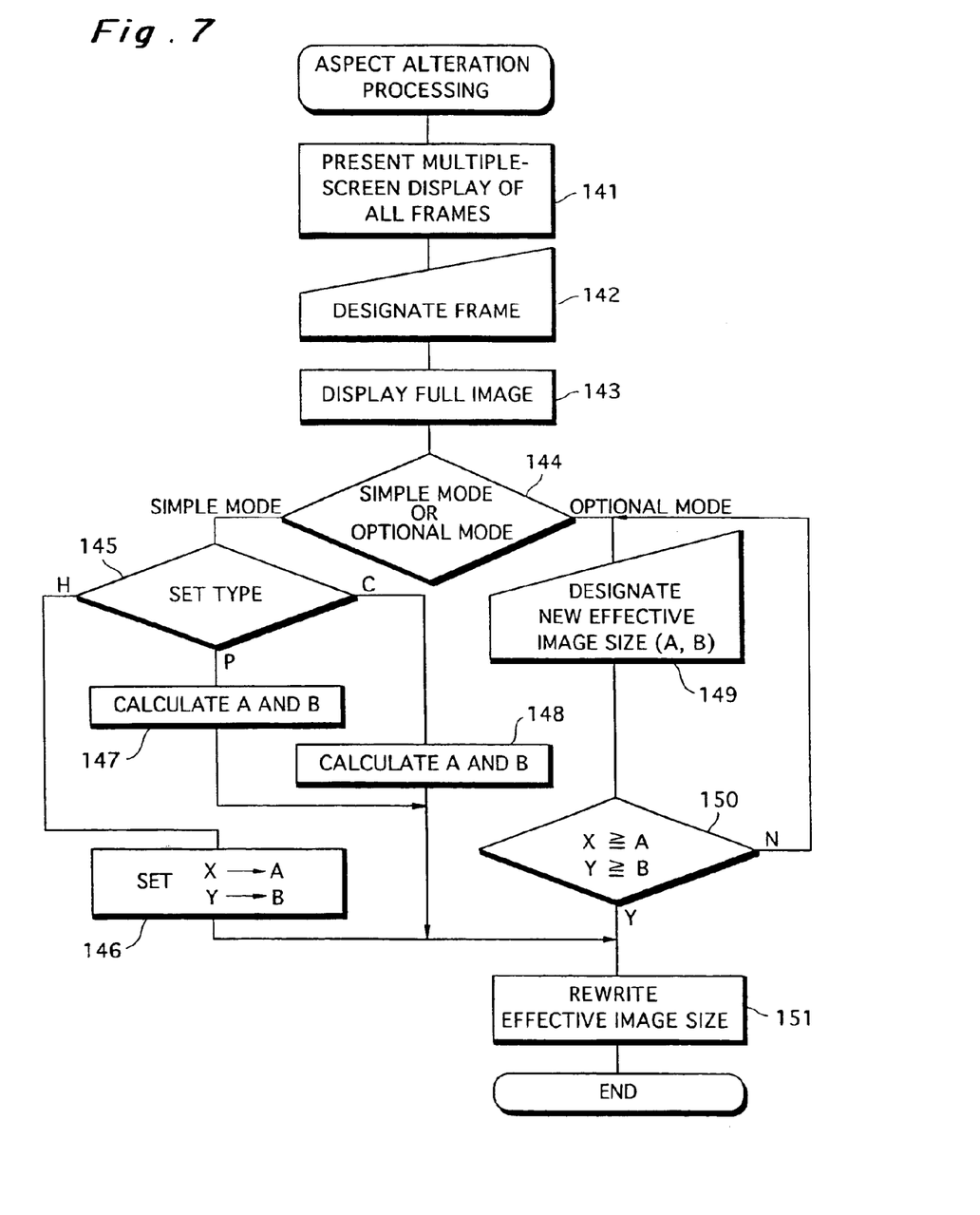
FIG. 7 is a flowchart showing aspect alteration processing.

Aspect alteration processing illustrated in FIG. 7 is processing for rewriting the effective image size (length A and width B) present in an image file. This processing is particularly significant in regard to an image file containing image data read from new-type photographic film.

This aspect alteration processing can be executed by the filing system (FIG. 1) and by the reproduction apparatus (FIG. 6). In case of execution in the filing system, a floppy disk is loaded in the floppy disk device 25 or an optical disk is loaded in the optical disk device 26. In case of execution in the reproduction apparatus, the floppy disk or optical disk is loaded in the disk driver 32. A transition is made to this processing in both the filing system and the reproduction apparatus in response to entry of an aspect-alteration processing command.

In the description that follows, a case in which aspect alteration processing is executed by the filing system will be set forth in detail. The elements constructing the reproduction apparatus used in the case where processing is executed by the reproduction apparatus are indicated within parentheses.

Thumbnail image data in all image files (or image files relating to a designated group, e.g., the frames contained on one specific roll of photographic film) that have been recorded on a floppy disk or optical disk are read out of the disk by the disk device 25 or 26 (disk driver 32), and the thumbnail images represented by these thumbnail image data are displayed on the screen of the display unit 15 (display unit 34) in rows and columns (step 141) (i.e., so as to form a multiple-screen display). In a case where the number of thumbnail image frames to be displayed is too large, the images are displayed not all at once but in groups displayed in succession.

In this multiple-screen display, it is preferred that the displayed thumbnail images be trimmed at an aspect ratio corresponding to the effective image size (the dimensions A and B) in the image file. For example, in a case where the effective image size indicates an aspect ratio of panoramic type, a displayed thumbnail image would have a long, slender profile comprising only the central portion of the image, the upper and lower portions being cut away in strip-like fashion. If this expedient is adopted, the operator or user will be able to ascertain the effective image size stored in each image file and to judge the suitability of the aspect ratio. An arrangement may be adopted in which a thumbnail image is displayed at an aspect ratio identical with that of the original image and a frame having an aspect ratio decided by the effective image size is displayed on this displayed thumbnail image.

Upon observing a plurality of displayed thumbnail images, the operator or user employs the operating unit 12 (input unit 31) to designate an image whose aspect ratio is to be altered or is desired to be altered (step 142). When this is done, the original image data that have been stored in the image file containing the designated thumbnail image are read out and, if the data have been compressed, the data are subjected to decompression processing. The image (the entire image) represented by these image data is displayed on the display unit 15 (display unit 34) (step 143).

There are two ways to alter aspect (the dimensions A, B of effective image size), namely in a simple mode and in an optional mode. The simple mode is one in which high-definition type (H), conventional type (C) or panoramic type (P) is selected. This mode is particularly effective in altering the aspect of image data obtained from new-type photographic film. The optional mode is one in which A and B of the effective image size can be set to any number of pixels. The optional mode is effective in altering the aspect of image data obtained from any input medium whatsoever. The operator or user selects either of these modes (step 144).

In a case where the simple mode has been selected, the operator or user selects either the high-definition type, conventional type or panoramic type (step 145). This selection is of course made using the operating unit 12 (input unit 31). It is preferred that the vertical and horizontal lines representing the contour of the selected type be displayed in a form superimposed the display of the original image.

In a case where the high-definition mode has been selected, values equal to length X and width Y of the full image in the image file to undergo processing are set (temporarily stored in memory) as length A and width B of the new effective image size (step 146).

In cases where the conventional type and panoramic type have been selected, A and B of the new effective image size are calculated based upon the aspect ratios predetermined with regard to these types (steps 147, 148).

When the conventional type has been selected, length X of the full image is employed as is for the A dimension of the effective image size relating to length, and only width B is calculated in accordance with the equation below. It is assumed here that the aspect ratio (width×height) of the high-definition type is 16×9 and that the aspect ratio of the conventional type is 3×2.

$$B=(3/2)\times(9/16)\times Y$$

When the panoramic type has been selected, width Y of the full image is employed as is for the B dimension of the effective image size relating to width, and only length A is calculated in accordance with the equation below. It is assumed here that the aspect ratio of the panoramic type is 16×5.

$$A=(5/6)\times X$$

In a case where the optional mode has been selected, the new effective image size (length A and width B) is entered by the operator or user from the operating unit 12 (input unit 31) (step 149). For example, it will suffice to adopt an arrangement in which the effective image size can be entered by using a cursor (arrow) or the like to designate positions for the height and width of the new contour on the screen displaying the original image.

The dimensions A and B of the new effective image size that has been entered must be equal to or less than the length X and width Y, respectively, of the full image. Accordingly, it is determined whether the relations X≧A, Y≧B hold (step 150). If these relations do not hold, it is required that A and B of the new effective image size be entered again.

When A and B of the new effective image size have thus been decided, the data representing the effective image size in the image file to undergo processing are rewritten using the new effective image size data. This rewriting operation is performed on the floppy disk or optical disk by the disk device 25 or 26 (disk driver 32).

When, after the new effective image size has been decided, the original image being displayed is trimmed to the size of the effective image size and then displayed, the operator or user is capable of visually confirming the altered aspect ratio.

An arrangement may be adopted in which, after a new effective image size has been decided with regard to an image file of one frame, the program returns to step 141, the next frame is designated and a new effective image size is decided for this frame in the same manner as described above. Following the conclusion of aspect alteration processing with regard to the image files of all desired frames, the program proceeds to rewrite processing (step 151) for rewriting the new effective image size on the disk.

(6) Reproduction Processing

Figure 8:
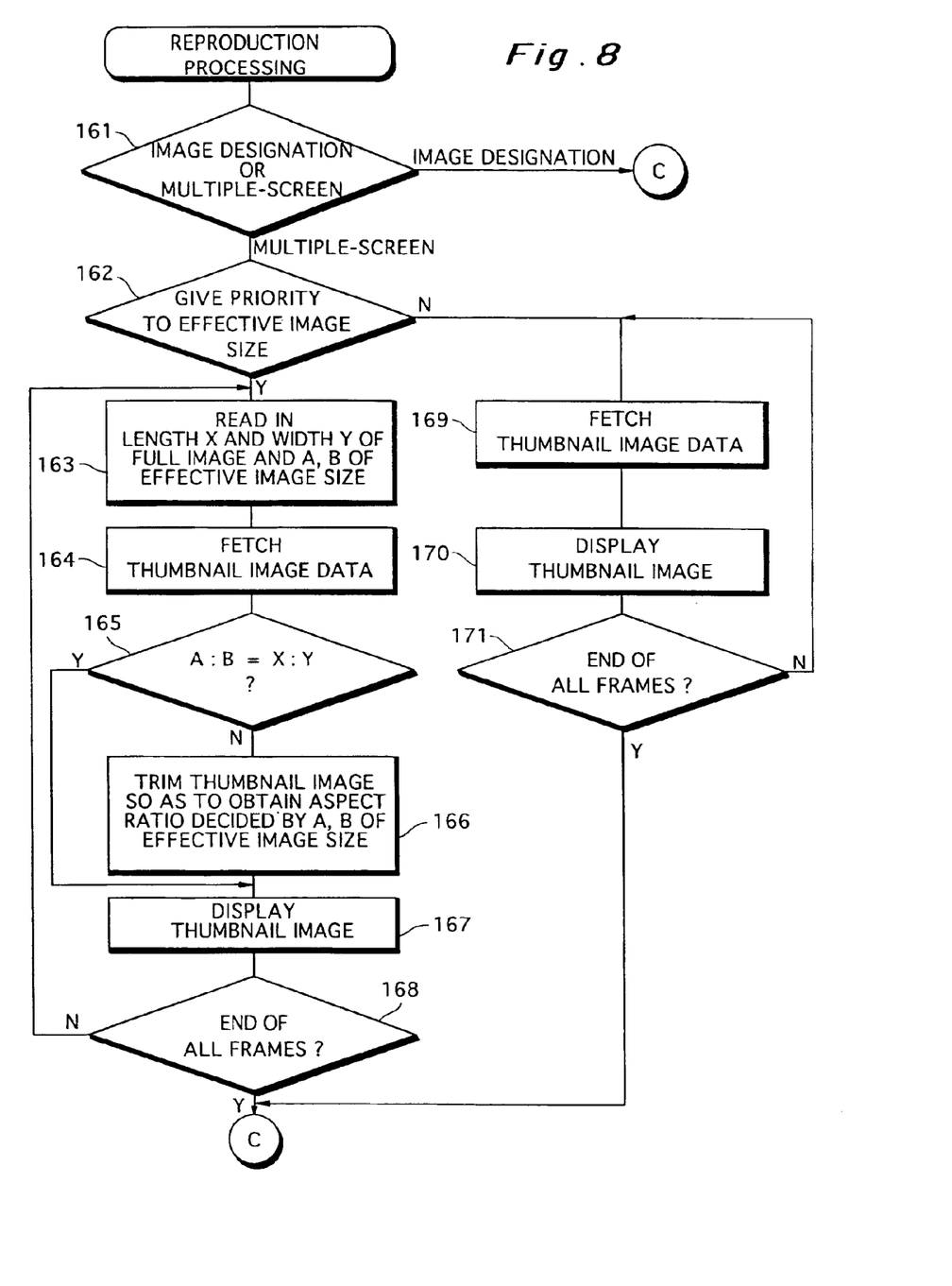
FIGS. 8 and 9 are flowcharts illustrating reproduction processing.
Figure 9:
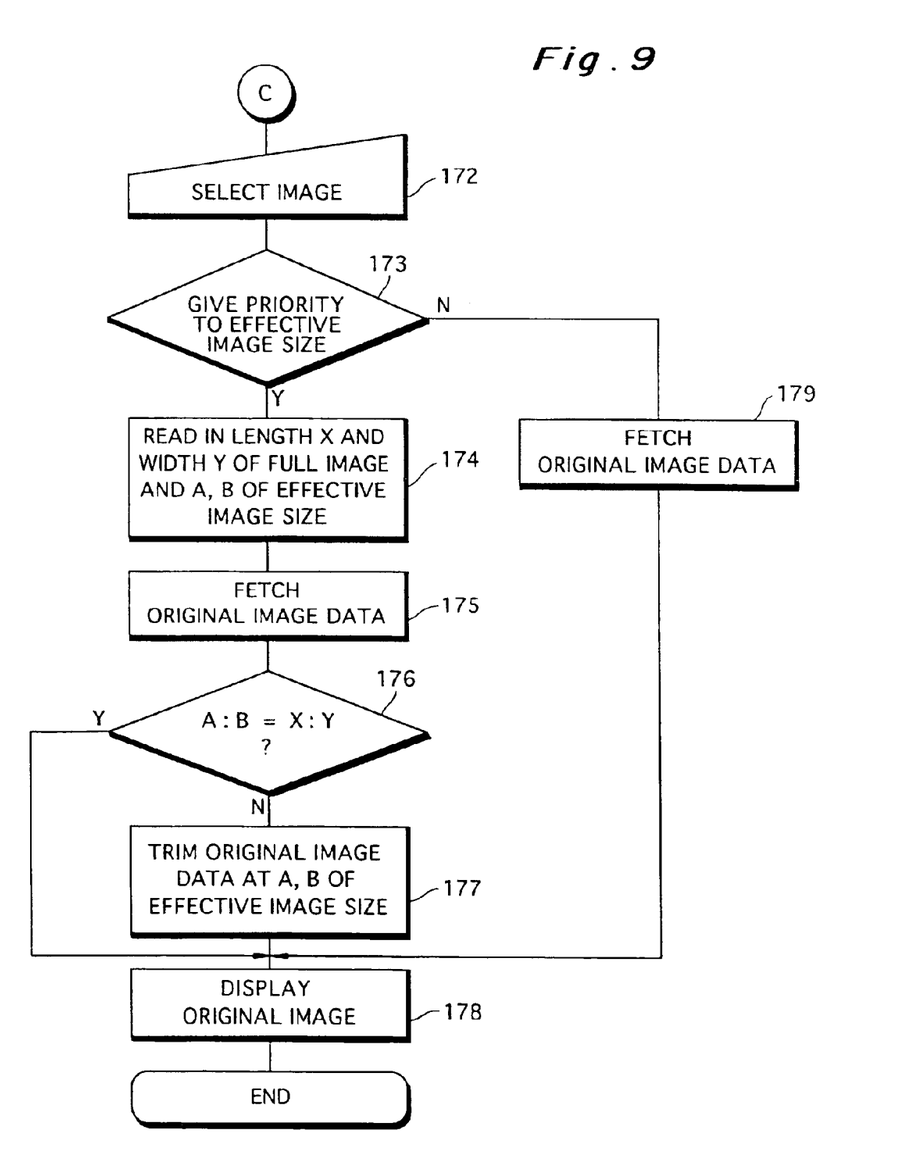

The reproduction processing shown in FIGS. 8 and 9 is processing whereby an image represented by original image data in an image file recorded on an output medium (floppy disk or optical disk) is displayed on a display unit. This processing also can be executed in both the filing system (FIG. 1) and reproduction apparatus (FIG. 6). In case of execution in the filing system, a floppy disk is loaded in the floppy disk device 25 or an optical disk is loaded in the optical disk device 26. In case of execution in the reproduction apparatus, the floppy disk or optical disk is loaded in the disk driver 32. Reproduction processing starts in response to a reproduction command.

In the description that follows, a case in which reproduction processing is executed by the reproduction apparatus will be set forth in detail. The elements constructing the filing system used in the case where processing is executed by the filing system are indicated within parentheses.

The operator or user is capable of selecting a first method in which first a multiple-screen display comprising an array of a number of thumbnail images is presented and a desired image (an image to be reproduced) is selected from the array, or a second method in which a desired image (an image to be reproduced) is designated from the start (step 161).

In a case where the multiple-screen display (the first method) has been selected using the input unit 31 (operating unit 12), the operator or user then makes an entry upon determining whether the mode is one in which priority is given to the effective image size (step 162). The mode in which priority is given to the effective image size is one for deciding the aspect ratio of a thumbnail image, which is displayed on the multiple-screen display, based upon the effective image size data.

In a case where this mode has been selected, the length X and width Y of the full image, the dimensions A and B of the effective image size and the thumbnail image data are read out of one image file that has been recorded on the output medium and these are temporarily stored in the memory of the computer 30 (computer 11) (steps 163, 164).

It is determined whether A/B=X/Y holds (step 165). If this equation is satisfied, the aspect ratio of the original image (the thumbnail image created based upon the original image) and the aspect ratio decided by the effective image size data A, B will be equal. Accordingly, no manipulation of the thumbnail image is required.

If the above-mentioned equation is not satisfied, the thumbnail image data read out are trimmed so as to represent an image having the aspect ratio decided by the effective image size data A, B (step 166). That is, the superfluous portion of the thumbnail image data is deleted. The thumbnail image represented by the thumbnail image data thus obtained is displayed at a predetermined position on the screen of the display unit 34 (display unit 15).

A multiple-screen display comprising an array of a number of thumbnail images is presented (step 168) by repeatedly executing the processing of steps 163–167 regarding all of the image files (or image files belonging to a designated group, e.g., the image files of image data obtained from one roll of photographic film) that have been recorded on the output medium. These thumbnail images have respective aspect ratios stipulated by the effective image size data.

In a case where the mode is not one in which priority is given to effective image size, the thumbnail image data are read in from the image file on the output medium (step 169) and the thumbnail image represented by the thumbnail image data are displayed at a predetermined position on the display screen of the display unit 34 (display unit 15) (step 170). By executing the processing of steps 169, 170 with regard to a predetermined number (predetermined range) of image files (step 171), multiple images comprising an array of a number of thumbnail images will be displayed on the display screen. The displayed thumbnail images have the aspect ratios created when the images are recorded on the output medium.

When a multiple-screen display is thus presented, the operator or user is capable of selecting a desired image (an image to be reproduced) from the multiple images.

In both the case where the operator or user has selected the second method through which an image to be reproduced is designated from the start and the case where the operator or user has selected the multiple-screen display (the first method), the image to be reproduced is designated (step 172). In the second method in which the image to be reproduced is designated from the start, the image to be reproduced would be selected by entering the frame number (and an identification code of the film if required). In the case where the multiple-screen display is presented, the operator or user would designate, on the multiple-screen display, the thumbnail image corresponding to the image to be reproduced.

There is a mode for giving priority to the effective image size even in the display of an original image. If this mode has been selected (step 173), the length X and width Y of the full image, the dimensions A and B of the effective image size and the original image data (the image data that have been stored in the image data recording area) are read out of the designated image file and stored temporarily in memory (steps 174, 175). If the original image data have been compressed, then these data are decompressed.

It is determined whether the read data satisfy the equation A/B=X/Y (step 176). If this equation is not satisfied, only the image data in the range stipulated by A and B of the effective image size is trimmed from the original image data (step 177) and the image represented by the trimmed original image data is displayed (reproduced) on the display unit 34 (display unit 15. Accordingly, an original image having an aspect ratio stipulated by the effective image size data A, B is displayed (reproduced).

Figure 10:
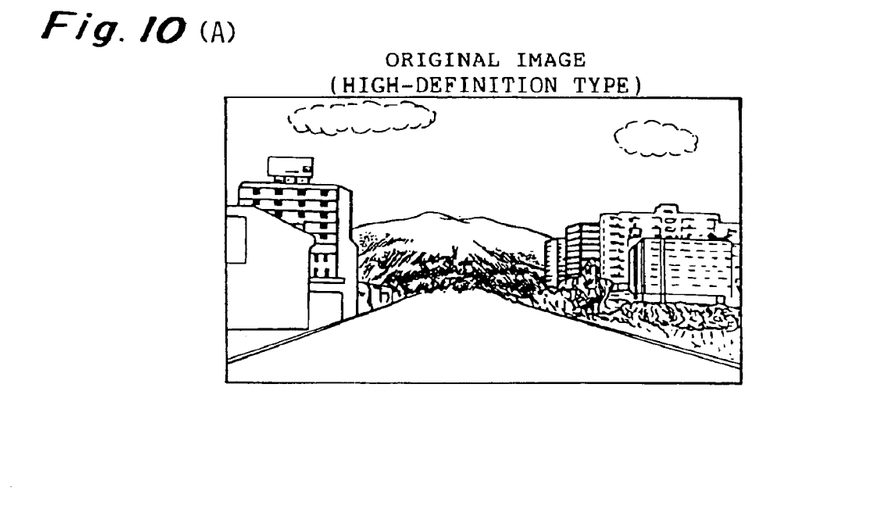
FIGS. 10(a)–10(c) show examples of displayed images having different aspect ratios.

FIGS. 10(*a*)–10(*c*) illustrate examples of images displayed at various aspect ratios.

In a case where the mode is not one in which priority is given to effective image size, the original image data are read out of the designated image file (step 179) and the image represented by these original image data is displayed (reproduced) (step 178).

As many apparently widely different embodiments of the present invention can be made without departing from the spirit and scope thereof, it is to be understood that the invention is not limited to the specific embodiments thereof except as defined in the appended claims.

What is claimed is:

1. A reproduction apparatus comprising:

reading unit for reading digital image data from a recording medium on which the digital image data, data representing the size of a full image and data representing the size of an effective image have been stored in mutually correlated form;

a display for displaying an image which represents the digital image data that has been read; and aspect altering means responsive to an entered aspect alteration command for rewriting the data representing the size of the effective image, which data has been recorded on the recording medium, by new data representing an instructed size for the effective image.

2. The apparatus according to claim 1, wherein said display displays an image having an aspect ratio decided based upon the data representing the size of the effective image.

3. A reproduction apparatus comprising:

readout means for reading data out of a recording medium on which digital image data, data representing the size of a full image and data representing the size of an effective image have been stored in mutually correlated form;

manipulating means for manipulating the digital image data, which has been read out by said readout means, to image data representing an image having an aspect ratio stipulated by the data representing the size of the effective image; and display means for displaying the image represented by the image data manipulated by said manipulating means.

4. The apparatus according to claim 3, wherein said recording medium stores, in mutually correlated form, original digital image data, reduced-image data and data representing the size of the original digital image data and data representing the size of the effective image;

said manipulating means, in response to a reduced-image display command, manipulates the reduced-image data to reduced-image data representing a reduced image having an aspect ratio stipulated by the data representing the size of the effective image; and the reduced image represented by the reduced-image data manipulated by said manipulating means is displayed on said display means.

* * * * *